(12) United States Patent
Shih

(10) Patent No.: US 10,809,518 B2
(45) Date of Patent: Oct. 20, 2020

(54) LENS MODULE

(71) Applicants: Sintai Optical (Shenzhen) Co., Ltd., ShenZhen, Guandong Province (CN); Asia Optical Co., Inc., Taichung (TW)

(72) Inventor: Ming-Wei Shih, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 152 days.

(21) Appl. No.: 16/266,439

(22) Filed: Feb. 4, 2019

(65) Prior Publication Data

US 2019/0331908 A1    Oct. 31, 2019

(51) Int. Cl.
*G02B 23/08*    (2006.01)
*G02B 7/02*    (2006.01)

(52) U.S. Cl.
CPC ............. *G02B 23/08* (2013.01); *G02B 7/021* (2013.01)

(58) Field of Classification Search
CPC ................................ G02B 23/08; G02B 7/021
USPC .......................................................... 359/402
See application file for complete search history.

(56) References Cited

U.S. PATENT DOCUMENTS

| | | | | |
|---|---|---|---|---|
| 4,134,637 A * | 1/1979 | Leisegang | ................. | A61B 1/04 359/363 |
| 4,195,922 A * | 4/1980 | Hajnal | .................... | G02B 23/08 285/404 |
| 4,275,639 A * | 6/1981 | Garber | ................... | G02B 23/08 359/405 |
| 4,868,588 A * | 9/1989 | Hajnal | ................... | G02B 23/08 396/432 |
| 6,122,100 A * | 9/2000 | Miller | .................... | G02B 23/08 359/402 |
| 6,311,424 B1 * | 11/2001 | Burke | ....................... | F41G 1/40 42/111 |
| 8,025,446 B2 * | 9/2011 | Lai | ....................... | G02B 13/007 396/351 |
| 10,215,968 B2 * | 2/2019 | Bae | ......................... | G02B 7/021 |
| 10,409,145 B2 * | 9/2019 | Kuroda | ............. | G03B 21/2066 |
| 2019/0004328 A1 * | 1/2019 | Lee | ........................ | G02B 7/08 |
| 2019/0219915 A1 * | 7/2019 | Kayano | ................ | H04N 9/3179 |

* cited by examiner

*Primary Examiner* — Collin X Beatty
(74) *Attorney, Agent, or Firm* — McClure, Qualey & Rodack, LLP

(57) ABSTRACT

A lens module includes an optical turning unit and a lens unit. The optical turning unit includes a reflecting surface. The lens unit includes a lens barrel and a lens constituting an optical axis, and the lens barrel includes a first end portion adjacent to the optical turning unit. The reflecting surface and the optical axis meet at an intersection point, a distance from the intersection point to the lens is a fourth length, a distance from the intersection point to the first end portion is a fifth length, and a normal line of the reflecting surface is sloped at a first angle with respect to the optical axis. The lens module satisfies: 0.8<tan ($\alpha$)×A'/B'<1, $\alpha$ is the first angle, A' is the fourth length, and B' is the fifth length.

20 Claims, 5 Drawing Sheets

LENS MODULE

BACKGROUND OF THE INVENTION

Field of the Invention

The invention relates to a lens module, and more particularly to a lens module for a periscope.

Description of the Related Art

During an operation of a conventional lens module, a space between a lens unit of the lens module and other optical elements is small because of the structure of the lens unit, thereby constraining the movement range of the lens unit or other optical elements. Therefore, the performance of "OIS (Optical Image Stabilization)" function is affected.

BRIEF SUMMARY OF THE INVENTION

The invention provides a lens module including a lens unit and an optical turning unit, and the lens unit includes a lens barrel and a lens, wherein the shape of the lens barrel is modified allowing the lens to protrude from the lens barrel. As a result, a larger space between the lens unit and the optical turning unit is provided for the lens unit or the optical turning unit to move therein (i.e. the movement range of the lens unit or the optical turning unit becomes larger).

A lens module in accordance with an embodiment of the invention includes an optical turning unit and a lens unit. The optical turning unit includes a main body having a reflecting surface. The lens unit includes a lens barrel and at least one lens, wherein the lens constitutes an optical axis, the lens barrel includes a first end portion and a second end portion, and the first end portion is adjacent to the optical turning unit. A light beam travelling in a first direction is reflected by the reflecting surface for changing an optical path thereof and passes through the lens unit along the optical axis. The reflecting surface and the optical axis meet at an intersection point, a distance from the intersection point to the lens along the optical axis is a fourth length, a distance from the intersection point to the first end portion along the optical axis is a fifth length, and a normal line of the reflecting surface is sloped at a first angle with respect to the optical axis. The lens module satisfies: $0.8<\tan(\alpha)\times A'/B'<1$, $\alpha$ is the first angle, A' is the fourth length, and B' is the fifth length.

In another embodiment, the first angle ranges from 42 degrees to 48 degrees.

In yet another embodiment, the first angle ranges from 42 degrees to 48 degrees, and the first end portion and the second end portion are integrally formed as one piece or are two individual pieces.

In another embodiment, the first angle ranges from 42 degrees to 48 degrees, the first end portion and the second end portion are integrally formed as one piece or are two individual pieces, and the lens module further satisfies: $0.8<A'/B'<1$.

In yet another embodiment, the lens module further satisfies: $0.8<A'/B'<1$.

In another embodiment, the first end portion and the second end portion are integrally formed as one piece or are two individual pieces.

In yet another embodiment, the main body further includes a first surface facing the lens unit, a distance from the first surface to the lens along the optical axis is a first length, and a distance from the first surface to the first end portion along the optical axis is a second length. The second end portion is a portion of the lens barrel farthest away from the optical turning unit and opposite to the first end portion, a distance from the first surface to an end surface of the second end portion along the optical axis is a third length. The lens barrel has a height in a direction perpendicular to the optical axis, and the main body has a length in a direction parallel to the optical axis. The lens module further satisfies: $0.4<\tan(\alpha)\times A/B<0.8$ and $5<(H/G)\times C<11$, A is the first length, B is the second length, C is the third length, H is the height of the lens barrel, and G is the length of the main body.

In another embodiment, the main body further includes a first surface facing the lens unit, a distance from the first surface to the lens along the optical axis is a first length, and a distance from the first surface to the first end portion along the optical axis is a second length. The lens module further satisfies: $0.4<\tan(\alpha)\times A/B<0.8$ and $0.6<A/B<0.7$, A is the first length, and B is the second length.

In yet another embodiment, the optical turning unit further includes a first lens, the main body further includes a first surface and a second surface, the first lens is disposed on the first surface and is configured to focus the light beam, and the first lens and the main body are integrally formed as one piece or are two individual pieces.

In another embodiment, the optical turning unit further includes a second lens, the second lens is disposed on the second surface and is configured to focus the light beam, and the second lens and the main body are integrally formed as one piece or are two individual pieces.

A lens module in accordance with another embodiment of the invention includes an optical turning unit and a lens unit. The optical turning unit includes a main body having a reflecting surface. The lens unit includes a lens barrel and at least one lens, wherein the lens constitutes an optical axis, the lens barrel includes a first end portion and a second end portion, and the first end portion is adjacent to the optical turning unit. A light beam travelling in a first direction is reflected by the reflecting surface for changing an optical path thereof and passes through the lens unit along the optical axis. The second end portion is a portion of the lens barrel farthest away from the optical turning unit and opposite to the first end portion. The reflecting surface and the optical axis meet at an intersection point, a distance from the intersection point to an end surface of the second end portion along the optical axis is a sixth length, the lens barrel has a height in a direction perpendicular to the optical axis, and a normal line of the reflecting surface is sloped at a first angle with respect to the optical axis. The lens module satisfies: $0.7<((H/2)/C')\times H<1.6$, H is the height of the lens barrel, and C' is the sixth length.

In another embodiment, a distance from the intersection point to the lens along the optical axis is a fourth length, and a distance from the intersection point to the first end portion along the optical axis is a fifth length. The lens module further satisfies: $0.8<A'/B'<1$, A' is the fourth length, and B' is the fifth length.

In yet another embodiment, the main body further includes a first surface facing the lens unit, a distance from the first surface to the lens along the optical axis is a first length, and a distance from the first surface to the first end portion along the optical axis is a second length. A distance from the first surface to the surface the second end portion along the optical axis is a third length. The main body has a length in a direction parallel to the optical axis. The lens module further satisfies: $0.4<\tan(\alpha)\times A/B<0.8$ and $5<(H/$ G)×C<11, A is the first length, B is the second length, C is the third length, α is the first angle, and G is the length of the main body.

In another embodiment, the main body further includes a first surface facing the lens unit, a distance from the first surface to the lens along the optical axis is a first length, and a distance from the first surface to the first end portion along the optical axis is a second length. The lens module further satisfies: 0.4<tan (α)×A/B<0.8 and 0.6<A/B<0.7, A is the first length, B is the second length, and α is the first angle.

In yet another embodiment, the main body further includes a first surface facing the lens unit, a distance from the first surface to the lens along the optical axis is a first length, a distance from the first surface to the first end portion along the optical axis is a second length, and a distance from the first surface to an end surface of the second end portion along the optical axis is a third length. The main body has a length in a direction parallel to the optical axis. The lens module further satisfies: 0.4<tan (α)×A/B<0.8, 5<(H/G)×C<11 and 0.6<A/B<0.7, where A is the first length, B is the second length, C is the third length, H is the height of the lens barrel, and G is the length of the main body.

A lens module in accordance with yet another embodiment of the invention includes an optical turning unit and a lens unit. The optical turning unit includes a main body having a reflecting surface. The lens unit includes a lens barrel and at least one lens, wherein the lens constitutes an optical axis, the lens barrel includes a first end portion and a second end portion, and the first end portion is adjacent to the optical turning unit. A light beam travelling in a first direction is reflected by the reflecting surface for changing an optical path thereof and passes through the lens unit along the optical axis. The reflecting surface and the optical axis meet at an intersection point, a distance from the intersection point to the lens along the optical axis is a fourth length, a distance from the intersection point to the first end portion along the optical axis is a fifth length, a normal line of the reflecting surface is sloped at a first angle with respect to the optical axis, the second end portion is a portion of the lens barrel farthest away from the optical turning unit and opposite to the first end portion, a distance from the intersection point to an end surface of the second end portion along the optical axis is a sixth length, and the lens barrel has a height in a direction perpendicular to the optical axis. The lens module satisfies: 0.8<tan (α)×A'/B'<1 and 0.7<((H/2)/C')×H<1.6, α is the first angle, A' is the fourth length, and B' is the fifth length, H is the height of the lens barrel, and C' is the sixth length.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
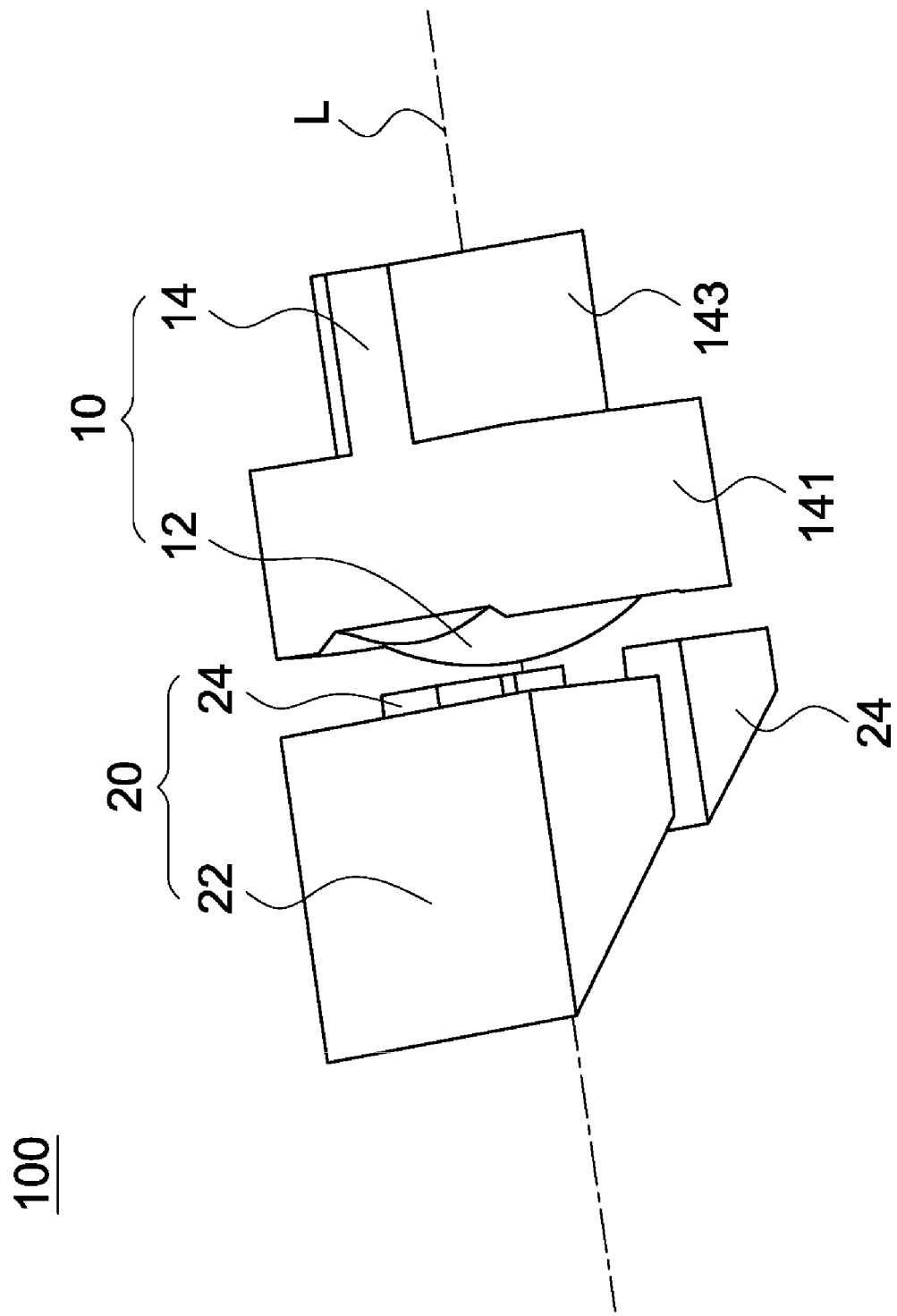
FIG. 1 is a perspective view of a lens module in accordance with a first embodiment of the invention.

Referring to FIG. 1, a lens module 100 in accordance with a first embodiment of the invention includes a lens unit 10 and an optical turning unit 20. In operation, a light beam (not shown) emitted by an object (not shown) enters the optical turning unit 20 for changing a travelling direction thereof, passes through the lens unit 10 and is received by an optical sensor (not shown) for forming an image.

As shown in FIG. 1, the lens unit 10 includes at least one lens 12 and a lens barrel 14, wherein the lens 12 is the lens closest to the optical turning unit 20 if the lens unit 10 includes a plurality of lenses. The lens barrel 14 has a first end portion 141 and a second end portion 143, wherein the first end portion 141 is closest to and faces the optical turning unit 20 while the second end portion 143 is farthest away from the optical turning unit 20 and is opposite to the first end portion 141. The first end portion 141 is in contact with the lens 12. The first end portion 141 and the second end portion 143 are integrally formed as one piece. The lens 12 is carried by the lens barrel 14 and has an optical axis L, and the optical axis L extends to pass through the optical turning unit 20. The optical turning unit 20 includes a main body 22 and two mounting seats 24, wherein the main body 22 is a prism and is disposed in the mounting seats 24. It is understood that the first end portion 141 and the second end portion 143 can be modified into two individual pieces connected by any possible means, and respectively carry at least one lens.

Figure 2:
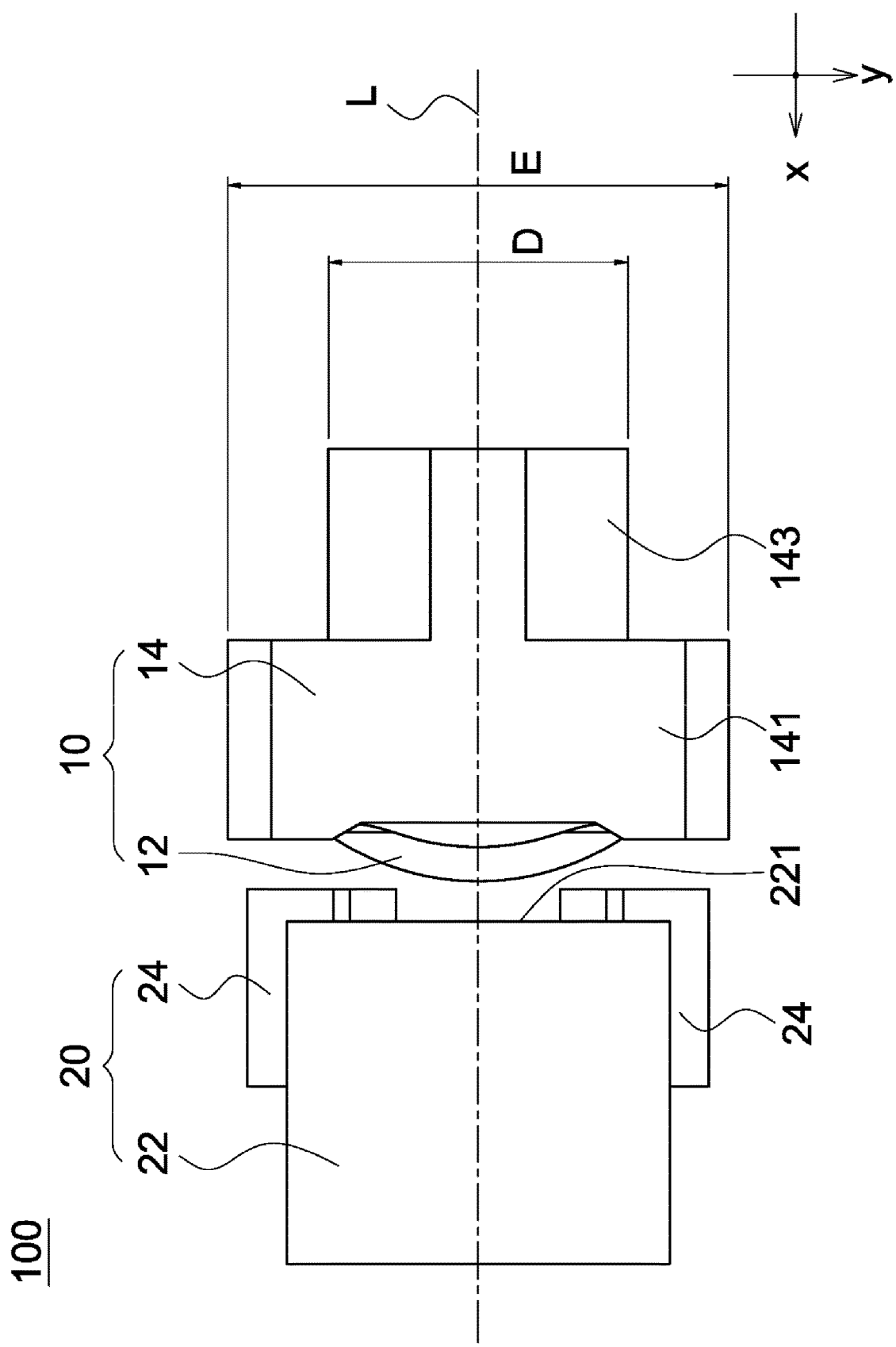
FIG. 2 is a top plan view of the lens module of FIG. 1.
Figure 3:
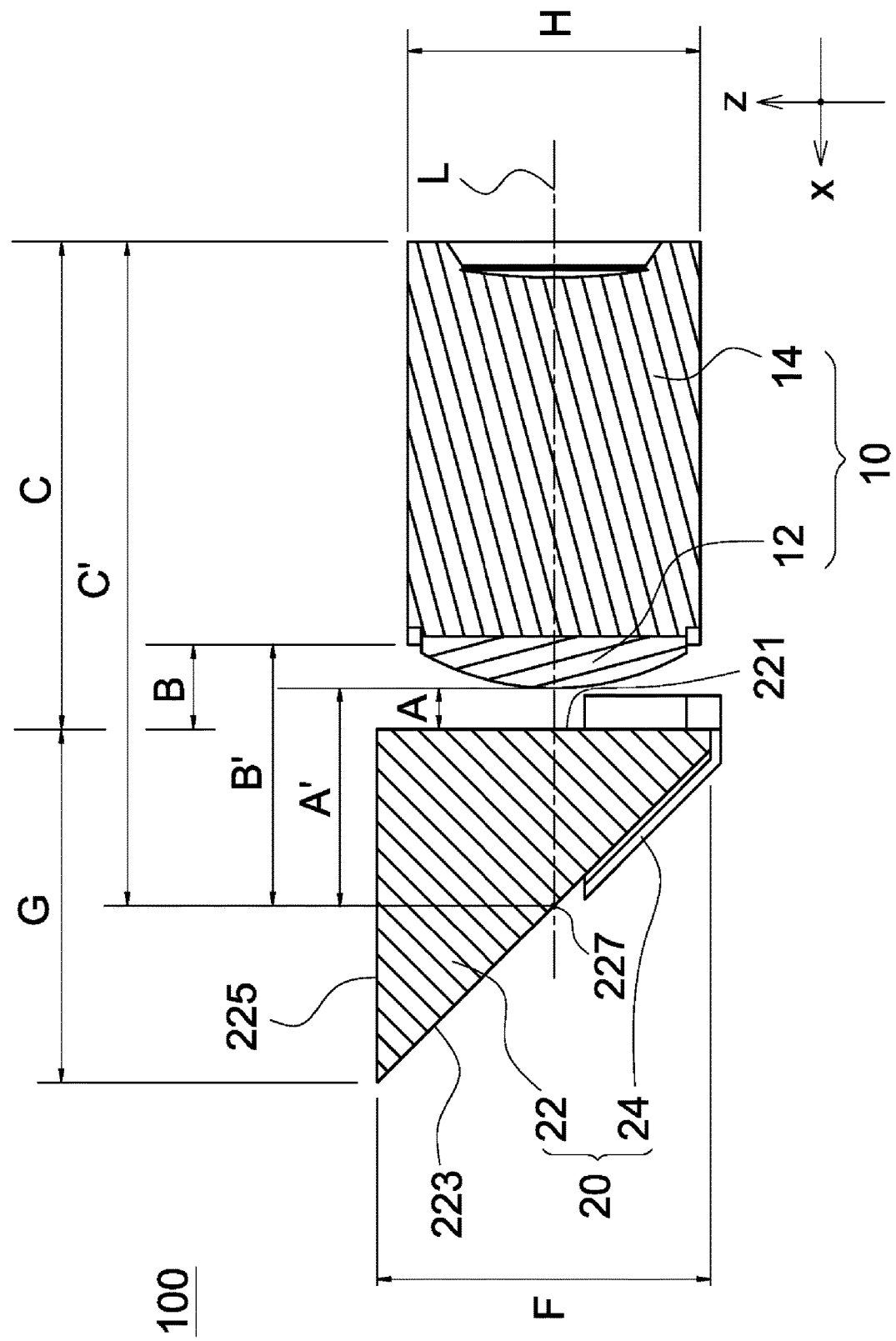
FIG. 3 is a sectional view of the lens module of FIG. 1, sectioned by a plane which is parallel to xz plane and passes through the optical axis L.

Referring to FIGS. 2 and 3, the main body 22 has a first surface 221, a reflecting surface 223 and a second surface 225, wherein the first surface 221 faces the lens unit 10. As labeled in FIG. 3, a distance from the first surface 221 to the lens 12 in a negative x-direction (or in a direction parallel to the optical axis L) is a first length A, a distance from the first surface 221 to the first end portion 141 of the lens barrel 14 in the negative x-direction is a second length B, and a distance from the first surface 221 to an end surface of the second end portion 143 of the lens barrel 14 in the negative x-direction is a third length C. The reflecting surface 223 and the optical axis L meet at an intersection point 227. A distance from the intersection point 227 to the lens 12 in the negative x-direction (or along the optical axis L) is a fourth length A', a distance from the intersection point 227 to the first end portion 141 of the lens barrel 14 in the negative x-direction (or along the optical axis L) is a fifth length B', and a distance from the intersection point 227 to the end surface of the second end portion 143 of the lens barrel 14 in the negative x-direction (or along the optical axis L) is a sixth length C'. The main body 22 has a length G in the x-direction parallel to the optical axis L, and has a height F in the z-direction perpendicular to the optical axis L. The lens barrel 14 has a height H in the z-direction. As labeled in FIG. 2, the first end portion 141 has a first width E in a y-direction, and the second end portion 143 has a second width D in the y-direction, wherein the y-direction is perpendicular to both the optical axis L and the z-direction.

It is worth noting that the first width E is greater than the second width D, the third length C is greater than the second length B, and the second length B is greater than the first length A. In other words, the lens 12 is the closer to the main body 22 than the first end portion 141 and the second end portion 143. When the lens unit 10 is observed in the z-direction or the y-direction, it is found that the lens 12 protrudes from the lens barrel 14. Such arrangement is able to increase a space between the lens unit 10 and the optical turning unit 20.

In the first embodiment, the first length A ranges from 0.55 mm to 0.93 mm, the second length B ranges from 0.83 mm to 1.38 mm, and the third length C ranges from 7.18 mm to 7.19 mm. The fourth length A' ranges from 3.15 mm to 3.53 mm, the fifth length B' ranges from 3.43 mm to 3.98 mm, and the sixth length C' ranges from 9.78 mm to 9.79 mm. The first width E of the first end portion 141 ranges from 5.6 mm to 7.6 mm, and the second width D of the second end portion 143 ranges from 4.54 mm to 4.7 mm. The height H of the lens barrel 14 ranges from 4.0 mm to 5.2 mm, the length G of the main body 22 is substantially 5.2 mm, and the height F of the main body 22 is substantially 4.9 mm. Moreover, the calculated value (H/G)×C that is obtained by multiplying a ratio of the height H of the lens barrel 14 to the length G of the main body 22 by the third length C ranges from 5.523 mm to 7.19 mm.

During the operation of the lens module 100, the light beam (not shown) emitted by the object (not shown) enters the optical turning unit 20, and the optical turning unit 20 is rotatable about a first axis (not shown) parallel to the y-direction for changing the travelling direction of the light beam, so that the light beam enters the lens unit 10. It is understood that a distance between the lens unit 10 and the optical turning unit 20 is changed during the rotation of the optical turning unit 20 about the first axis. The lens unit 10 is configured to move with respect to the optical turning unit 20 in the direction parallel to the optical axis L, so as to achieve "OIS (Optical Image Stabilization)" function. It is worth noting that a movement range of the lens unit 10 or the optical turning unit 20 is increased as the space between the lens unit 10 and the optical turning unit 20 is increased. Therefore, the performance of "OIS" function is improved.

Figure 4:
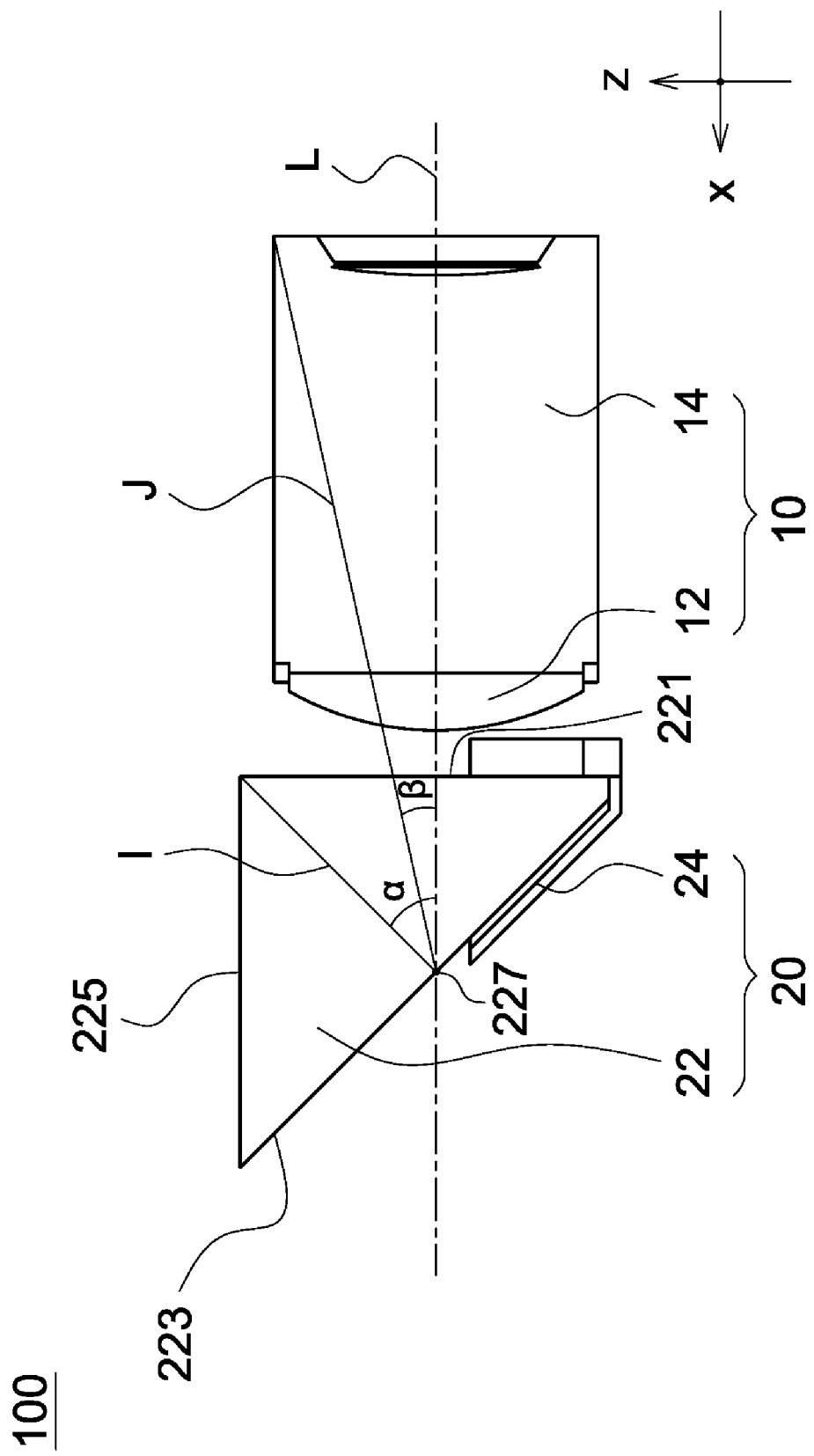
FIG. 4 depicts the sectioned lens module of FIG. 3 with the sectioned lines removed therefrom, in order to label a first angle α and a second angle β.

FIG. 4 shows a first line I which is perpendicular to the reflecting surface 223 of the main body 22. In other words, the first line I is a normal line of the reflecting surface 223 and is sloped at a first angle α with respect to the optical axis L. During the rotation of the optical turning unit 20 about the first axis, the first line I is rotated with respect to the optical axis L so as to change the first angle α. In the first embodiment, the first angle α ranges from 42 degrees to 48 degrees, a ratio of the first length A to the second length B ranges from 0.662 to 0.674, and a ratio of the fourth length A' to the fifth length B' ranges from 0.886 to 0.918. A first numeral value $V_1$ and a second numeral value $V_2$ can be represented as following equations (1) and (2):

$$V_1 = \tan(\alpha) \times A/B \quad (1)$$

$$V_2 = \tan(\alpha) \times A'/B' \quad (2)$$

where the equation (2) can be obtained by replacing the first length A and the second length B of the equation (1) with the fourth length A' and the fifth length B'. The first numeral value $V_1$ ranges from 0.597 to 0.748, which can be obtained by substituting the numeral values of the first angle α, the first length A and the second length B into the equation (1). The second numeral value $V_2$ ranges from 0.826 to 0.985, which can be obtained by substituting the numeral values of the first angle α, the fourth length A' and the fifth length B' into the equation (2).

FIG. 4 further shows a second line J which is the longest line that connects the intersection point 227 and the edge of the second end portion 143 and is sloped at a second angle β with respect to the optical axis L. The second angle β ranges from 12.5 degrees to 37.5 degrees. A third numeral value $V_3$ can be represented as following equation (3):

$$V_3 = \tan(\beta) \times H \quad (3)$$

The optical axis L, the second line J and the second angle β constitute a right triangle. "tan (β)" of the equation (3) is a ratio of a length of an opposite side of the second angle β to a length of an adjacent side of the second angle β. In the first embodiment, the length of the opposite side of the second angle β is half the height H, and the length of the adjacent side of the second angle β equals the sixth length C', wherein the sixth length C' equals the third length C plus a length from the intersection point 227 to the first surface 221. It is worth noting that the length from the intersection point 227 to the first surface 221 is substantially half the length G of the main body 22. Therefore, the equation (3) can be transformed to:

$$V_3 = ((H/2)/C') \times H \quad (4)$$

where the third numeral value $V_3$ ranges from 0.817 to 1.382, which can be obtained by substituting the numeral values of the sixth length C' and the height H of the lens barrel 14 into the equation (4). It is worth noting that the greater the third numeral value $V_3$, the easier to form the image, the wider the view of the lens module 100, and the better the visual performance of the lens module 100.

In a second embodiment, the length G of the main body 22 is substantially 4.9 mm, and the height F of the main body 22 is substantially 4.9 mm. The fourth length A' ranges from 3.00 mm to 3.38 mm, the fifth length B' ranges from 3.28 mm to 3.83 mm, and the sixth length C' ranges from 9.63 mm to 9.64 mm. A ratio of the fourth length A' to the fifth length B' ranges from 0.882 to 0.914, and a calculated value (H/G)×C that is obtained by multiplying a ratio of the height H of the lens barrel 14 to the length G of the main body 22 by the third length C ranges from 5.861 mm to 7.630 mm. After the calculation based on the equations (2) and (3), it is obtained that the second numeral value $V_2$ ranges from 0.823 to 0.980 as well as the third numeral value $V_3$ ranges from 0.830 to 1.404. The arrangement of other elements and operation are similar to those of the above embodiment, and therefore the descriptions thereof are omitted.

Figure 5:
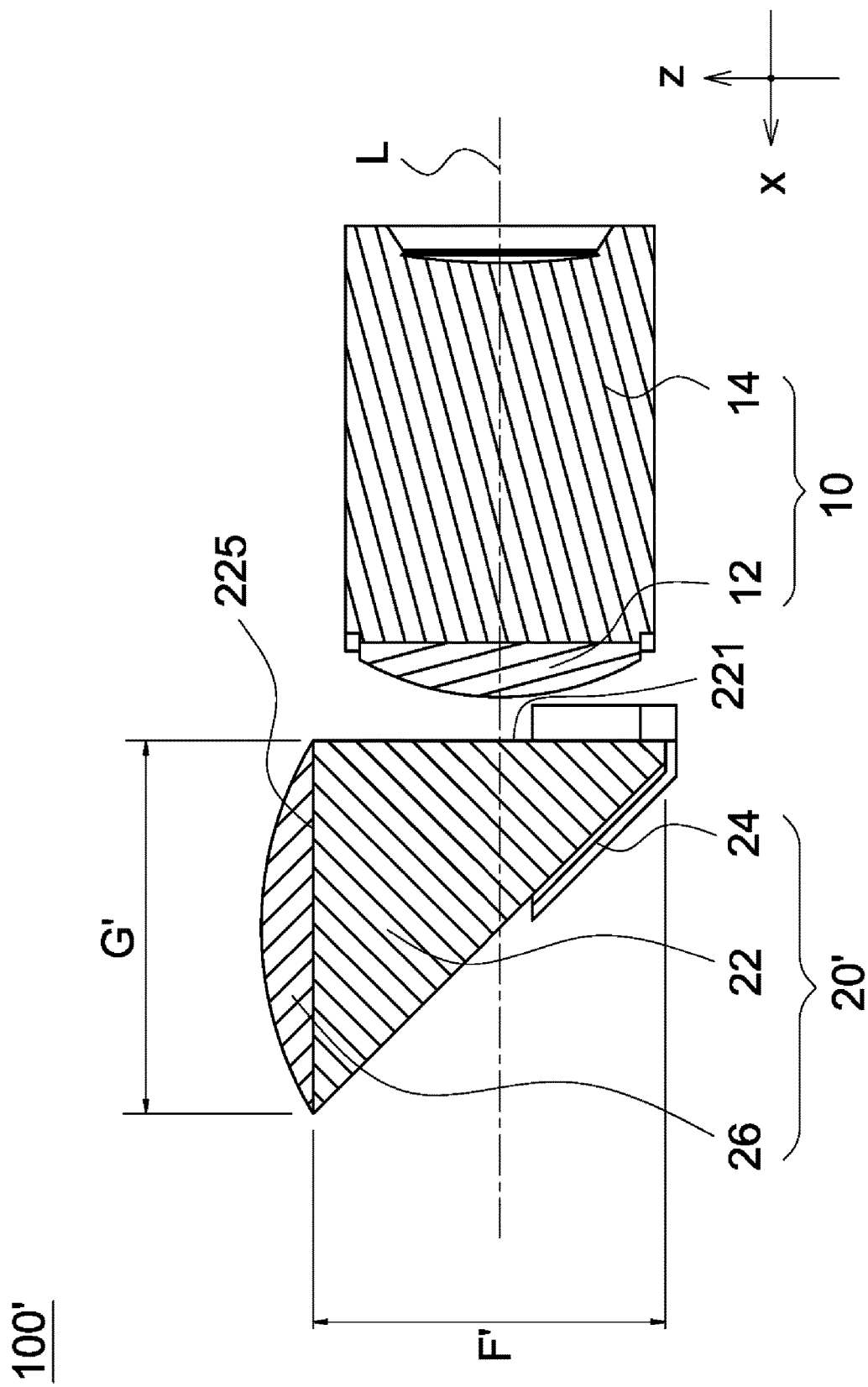
FIG. 5 is a sectional view of a lens module in accordance with a third embodiment of the invention.

Referring to FIG. 5, in a third embodiment, the optical turning unit 20' further includes a second lens 26 disposed on the second surface 225 of the main body 22 and configured to focus the light beam which is going to enter the main body 22. After entry into the optical turning unit 20', the light beam passes through the second surface 225, enters the main body 22, is reflected by the reflecting surface 223, leaves the main body 22 from the first surface 221 in the direction parallel to the optical axis L, and passes through the lens unit 10. In the third embodiment, the second lens 26 and the main body 22 are integrally formed as one piece. The length G' and the height F' of the main body 22 are substantially 3.58 mm. The fourth length A' ranges from 2.34 mm to 2.72 mm, the fifth length B' ranges from 2.62 mm to 3.17 mm, and the sixth length C' ranges from 8.97 mm to 8.98 mm. A ratio of the fourth length A' to the fifth length B' ranges from 0.858 to 0.893. A calculated value (H/G')×C that is obtained by multiplying a ratio of the height H of the lens barrel 14 to the length G' of the main body 22 by the third length C ranges from 8.022 mm to 10.443 mm. After the calculation based on the equations (2) and (3), it is obtained that the second numeral value $V_2$ ranges from 0.804 to 0.953 as well as the third numeral value $V_3$ ranges from 0.891 to 1.507. The arrangement of other elements and operation are similar to those of the above embodiment, and therefore the descriptions thereof are omitted.

A fourth embodiment and the third embodiment differ in the length G' and the height F' of the main body 22, the fourth length A', the fifth length B' and the sixth length C'. In the fourth embodiment, the length G' and the height F' of the main body 22 are substantially 3.5 mm. The fourth length A' ranges from 2.3 mm to 2.68 mm, the fifth length B' ranges from 2.58 mm to 3.13 mm, and the sixth length C' ranges from 8.93 mm to 8.94 mm. A ratio of the fourth length A' to the fifth length B' ranges from 0.856 to 0.891, and a calculated value (H/G')×C that is obtained by multiplying a ratio of the height H of the lens barrel 14 to the length G' of the main body 22 by the third length C ranges from 8.205 mm to 10.682 mm. After the calculation based on the equations (2) and (3), it is obtained that the second numeral value $V_2$ ranges from 0.802 to 0.951 as well as the third numeral value $V_3$ ranges from 0.895 to 1.514. The arrangement of other elements and operation are similar to those of the above embodiment, and therefore the descriptions thereof are omitted.

In the third and fourth embodiments, the second lens 26 is disposed on the second surface 225 of the main body 22 and is integrally formed with the main body 22 as one piece. However, the invention is not limited thereto. In another embodiment, the second lens 26 and the main body 22 are two individual pieces and are connected by any possible means (e.g. gluing). In yet another embodiment, in order to meet some requirements, the second lens 26 is disposed on the first surface 221 of the main body 22 to focus the light beam leaving the main body 22 from the first surface 221. In another embodiment, the optical turning unit further includes a first lens (not shown), wherein the first lens and the second lens 26 are respectively disposed on the first surface 221 and the second surface 225 of the main body 22. The first lens, the second lens 26 and the main body 22 are integrally formed as one piece or are three individual pieces, or two of them are integrally formed as one piece while the other one is an individual piece.

In above embodiments, the main body 22 is a prism. However, the invention is not limited thereto. In some other embodiments, the main body 22 may be a reflecting mirror, a refractor or a polarizer.

In the lens modules 100, 100' of the invention, the structure of the lens barrel 14, which carries the lens 12, is modified for increasing the movement range of the lens unit 10 or the optical turning unit 20, 20', so as to enhance the performance of "OIS" function. Therefore, the lens modules 100, 100' are able to have reduced thickness without affecting the optical performance thereof.

What is claimed is:

1. A lens module, comprising:
   an optical turning unit comprising a main body having a reflecting surface; and
   a lens unit comprising a lens barrel and at least one lens, wherein the lens constitutes an optical axis, the lens barrel comprises a first end portion and a second end portion, and the first end portion is adjacent to the optical turning unit;
   wherein a light beam travelling in a first direction is reflected by the reflecting surface for changing an optical path thereof and passes through the lens unit along the optical axis;
   wherein the reflecting surface and the optical axis meet at an intersection point, a distance from the intersection point to the lens along the optical axis is a fourth length, a distance from the intersection point to the first end portion along the optical axis is a fifth length, and a normal line of the reflecting surface is sloped at a first angle with respect to the optical axis;
   wherein the lens module satisfies: 0.8<tan (α)×A'/B'<1, α is the first angle, A' is the fourth length, and B' is the fifth length.

2. The lens module as claimed in claim 1, wherein the first angle ranges from 42 degrees to 48 degrees.

3. The lens module as claimed in claim 2, wherein the lens module further satisfies: 0.8<A'/B'<1.

4. The lens module as claimed in claim 2, wherein the first end portion and the second end portion are integrally formed as one piece or are two individual pieces.

5. The lens module as claimed in claim 1, wherein the main body further comprises a first surface facing the lens unit, a distance from the first surface to the lens along the optical axis is a first length, and a distance from the first surface to the first end portion along the optical axis is a second length;
   wherein the second end portion is a portion of the lens barrel farthest away from the optical turning unit and is opposite to the first end portion, and a distance from the first surface to an end surface of the second end portion along the optical axis is a third length;
   wherein the lens barrel has a height in a direction perpendicular to the optical axis, and the main body has a length in a direction parallel to the optical axis;
   wherein the lens module further satisfies: 0.4<tan (α)×A/B<0.8 and 5<(H/G)×C<11, where A is the first length, B is the second length, C is the third length, H is the height of the lens barrel, and G is the length of the main body.

6. The lens module as claimed in claim 1, wherein the main body further comprises a first surface facing the lens unit, a distance from the first surface to the lens along the optical axis is a first length, and a distance from the first surface to the first end portion along the optical axis is a second length;
   wherein the lens module further satisfies: 0.4<tan (α)×A/B<0.8 and 0.6<A/B<0.7, where A is the first length, and B is the second length.

7. The lens module as claimed in claim 1, wherein the optical turning unit further comprises a first lens, the main body further comprises a first surface and a second surface, the first lens is disposed on the first surface and is configured to focus the light beam, and the first lens and the main body are integrally formed as one piece or are two individual pieces.

8. The lens module as claimed in claim 7, wherein the optical turning unit further comprises a second lens, the second lens is disposed on the second surface and is configured to focus the light beam, and the second lens and the main body are integrally formed as one piece or are two individual pieces.

9. A lens module, comprising:
   an optical turning unit comprising a main body having a reflecting surface; and
   a lens unit comprising a lens barrel and at least one lens, wherein the lens has an optical axis, the lens barrel comprises a first end portion and a second end portion, and the first end portion is adjacent to the optical turning unit;
   wherein a light beam travelling in a first direction is reflected by the reflecting surface for changing an optical path thereof and passes through the lens unit along the optical axis;

wherein the second end portion is a portion of the lens barrel farthest away from the optical turning unit and is opposite to the first end portion;

wherein the reflecting surface and the optical axis meet at an intersection point, a distance from the intersection point to an end surface of the second end portion along the optical axis is a sixth length, the lens barrel has a height in a direction perpendicular to the optical axis, and a normal line of the reflecting surface is sloped at a first angle with respect to the optical axis;

wherein the lens module satisfies: $0.7<((H/2)/C')\times H<1.6$, where H is the height of the lens barrel, and C' is the sixth length.

10. The lens module as claimed in claim 9, wherein the first angle ranges from 42 degrees to 48 degrees;

wherein the first end portion and the second end portion are integrally formed as one piece or are two individual pieces.

11. The lens module as claimed in claim 10, wherein a distance from the intersection point to the lens along the optical axis is a fourth length, and a distance from the intersection point to the first end portion along the optical axis is a fifth length;

wherein the lens module further satisfies: $0.8<A'/B'<1$, where A' is the fourth length, and B' is the fifth length.

12. The lens module as claimed in claim 9, wherein the main body further comprises a first surface facing the lens unit, a distance from the first surface to the lens along the optical axis is a first length, and a distance from the first surface to the first end portion along the optical axis is a second length;

wherein a distance from the first surface to the end surface of the second end portion along the optical axis is a third length;

wherein the main body has a length in a direction parallel to the optical axis;

wherein the lens module further satisfies: $0.4<\tan(\alpha)\times A/B<0.8$ and $5<(H/G)\times C<11$, where A is the first length, B is the second length, C is the third length, $\alpha$ is the first angle, and G is the length of the main body.

13. The lens module as claimed in claim 9, wherein the main body further comprises a first surface facing the lens unit, a distance from the first surface to the lens along the optical axis is a first length, and a distance from the first surface to the first end portion along the optical axis is a second length;

wherein the lens module further satisfies: $0.4<\tan(\alpha)\times A/B<0.8$ and $0.6<A/B<0.7$, where A is the first length, B is the second length, and $\alpha$ is the first angle.

14. The lens module as claimed in claim 9, wherein the optical turning unit further comprises a first lens, the main body further comprises a first surface and a second surface, the first lens is disposed on the first surface and is configured to focus the light beam, and the first lens and the main body are integrally formed as one piece or are two individual pieces.

15. The lens module as claimed in claim 14, wherein the optical turning unit further comprises a second lens, the second lens is disposed on the second surface and is configured to focus the light beam, and the second lens and the main body are integrally formed as one piece or are two individual pieces.

16. A lens module, comprising:

an optical turning unit comprising a main body having a reflecting surface; and a lens unit comprising a lens barrel and at least one lens, wherein the lens has an optical axis, the lens barrel comprises a first end portion and a second end portion, and the first end portion is adjacent to the optical turning unit;

wherein a light beam travelling in a first direction is reflected by the reflecting surface for changing an optical path thereof and passes through the lens unit along the optical axis;

wherein the reflecting surface and the optical axis meet at an intersection point, a distance from the intersection point to the lens along the optical axis is a fourth length, a distance from the intersection point to the first end portion along the optical axis is a fifth length, a normal line of the reflecting surface is sloped at a first angle with respect to the optical axis, the second end portion is a portion of the lens barrel farthest away from the optical turning unit and is opposite to the first end portion, a distance from the intersection point to an end surface of the second end portion along the optical axis is a sixth length, and the lens barrel has a height in a direction perpendicular to the optical axis;

wherein the lens module satisfies: $0.8<\tan(\alpha)\times A'/B'<1$ and $0.7<((H/2)/C')\times H<1.6$, where $\alpha$ is the first angle, A' is the fourth length, and B' is the fifth length, H is the height of the lens barrel, and C' is the sixth length.

17. The lens module as claimed in claim 16, wherein the first angle ranges from 42 degrees to 48 degrees;

wherein the first end portion and the second end portion are integrally formed as one piece or are two individual pieces;

wherein the lens module further satisfies: $0.8<A'/B'<1$.

18. The lens module as claimed in claim 16, wherein the main body further comprises a first surface facing the lens unit, a distance from the first surface to the lens along the optical axis is a first length, a distance from the first surface to the first end portion along the optical axis is a second length, and a distance from the first surface to an end surface of the second end portion along the optical axis is a third length;

wherein the main body has a length in a direction parallel to the optical axis;

wherein the lens module further satisfies: $0.4<\tan(\alpha)\times A/B<0.8$, $5<(H/G)\times C<11$ and $0.6<A/B<0.7$, where A is the first length, B is the second length, C is the third length, H is the height of the lens barrel, and G is the length of the main body.

19. The lens module as claimed in claim 16, wherein the optical turning unit further comprises a first lens, the main body further comprises a first surface and a second surface, the first lens is disposed on the first surface and is configured to focus the light beam, and the first lens and the main body are integrally formed as one piece or are two individual pieces.

20. The lens module as claimed in claim 19, wherein the optical turning unit further comprises a second lens, the second lens is disposed on the second surface and is configured to focus the light beam, and the second lens and the main body are integrally formed as one piece or are two individual pieces.

* * * * *